(12) United States Patent
Kleyman et al.

(10) Patent No.: US 7,654,021 B2
(45) Date of Patent: Feb. 2, 2010

(54) THREE-DIMENSIONAL IMAGE RETAINER

(76) Inventors: Gennady Kleyman, 1290 E. 19th St., Apt 3A, Brooklyn, NY (US) 11230; Yurly Chernov, 2337 E. 22nd., Brooklyn, NY (US) 11229

( * ) Notice: Subject to any disclaimer, the term of this patent is extended or adjusted under 35 U.S.C. 154(b) by 0 days.

(21) Appl. No.: 11/225,414

(22) Filed: Sep. 13, 2005

(65) Prior Publication Data
US 2007/0056178 A1 Mar. 15, 2007

(51) Int. Cl.
*A47F 11/06* (2006.01)
(52) U.S. Cl. .................. 40/427; 446/118; 33/561.1
(58) Field of Classification Search .............. 40/427; 33/514.2, 561.1; 446/118
See application file for complete search history.

(56) References Cited

U.S. PATENT DOCUMENTS

| | | | |
|---|---|---|---|
| 1,989,680 A | 2/1935 | Carver et al. | |
| 2,163,938 A * | 6/1939 | Dickson | 33/561.1 |
| 2,266,457 A * | 12/1941 | Wolff | 33/561.1 |
| 2,523,647 A | 9/1950 | Burk | |
| 2,621,415 A * | 12/1952 | Cooper | 33/561.1 |
| 3,568,357 A | 3/1971 | Lebensfeld | |
| 4,536,980 A | 8/1985 | Flemming | |
| 4,654,989 A | 4/1987 | Flemming | |
| 5,555,163 A | 9/1996 | Pisani | |
| 5,644,860 A | 7/1997 | Piper et al. | |
| 6,189,246 B1 | 2/2001 | Gortala | |
| 6,298,587 B1 * | 10/2001 | Vollom | 40/427 |
| 6,860,784 B2 * | 3/2005 | Chernov et al. | 446/118 |
| 2004/0020087 A1 * | 2/2004 | Fleming | 40/446 |

\* cited by examiner

*Primary Examiner*—Gary C Hoge
(74) *Attorney, Agent, or Firm*—The Farrell Law Firm, LLP (57) ABSTRACT

A 3-D image retainer is configured to have a plurality of perforated retainer plates and a retainer assembly displaceable to lock selectively impressed pins, which traverse the retained plates, in the desired position corresponding to the 3-D contour of the applied load.

6 Claims, 10 Drawing Sheets

THREE-DIMENSIONAL IMAGE RETAINER

FIELD OF THE INVENTION

This invention relates to a three-dimensional image retainer.

BACKGROUND OF THE INVENTION

It is known to utilize devices capable of forming a three-dimensional image of an object. Typically, these devices are provided with a support and a plurality of pins which can slide through numerous holes formed in the support in response to an external load. Depending on a shape of the load, the pins are displaceable at different distances to form a contour corresponding to a shape of the load. While a three dimensional image is easily formed, it is difficult to preserve this image for a prolonged period of time. Particularly, displacing the support causes the pins to move from a position corresponding to the formed image.

It is therefore desirable to provide a three-dimensional image device which is capable of retaining a contour corresponding to the shape of a load even when the device is displaced.

SUMMARY OF THE INVENTION

These needs are satisfied by the inventive image retainer. Particularly, the device is provided with a plurality of pins each having a pair of smooth ends that are formed and dimensioned to prevent the device operator from uncomfortable feeling.

The inventive devices is configured with a plurality of retainer plates each having a respective multiplicity of openings, which are traversed by the pins. The pins are displaceable in response to applying a 3-D load to one end of the pins so that the pins selectively move toward an impressed position, in which the opposite ends of selectively impressed pins recreate the contour of the load. To ensure the impressed position of the selected pins, the inventive image retainer further includes a retaining assembly traversable by the plurality of pins and operative to move in a plane perpendicular to the pin axes so as to lock the pins in the impressed position.

BRIEF DESCRIPTION OF THE DRAWINGS

The above and other features and advantages will become more readily apparent from the following detailed description accompanied by the following drawings, in which.

DETAILED DESCRIPTION OF THE PREFERRED EMBODIMENTS

Figure 1:
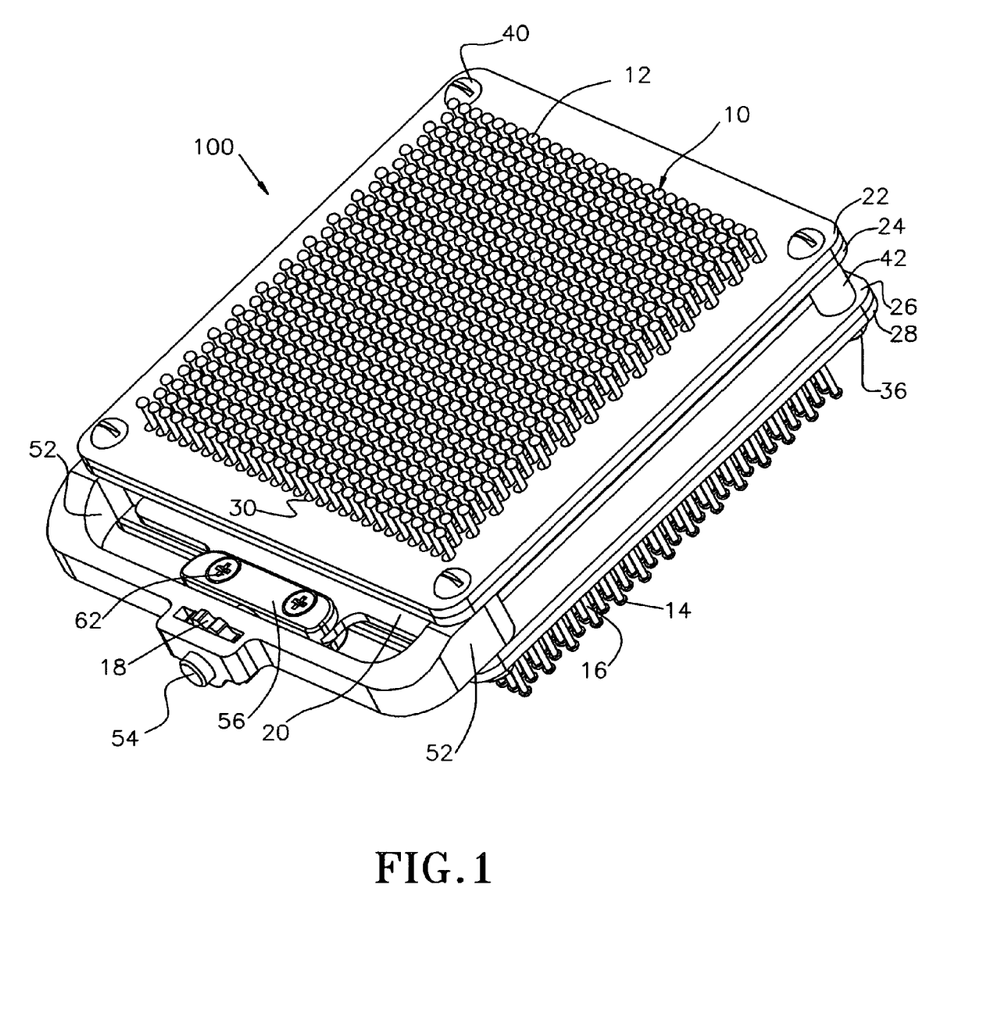
FIG. 1 is a perspective view of an image retainer assembled in accordance with one embodiment of the invention.
Figure 2:
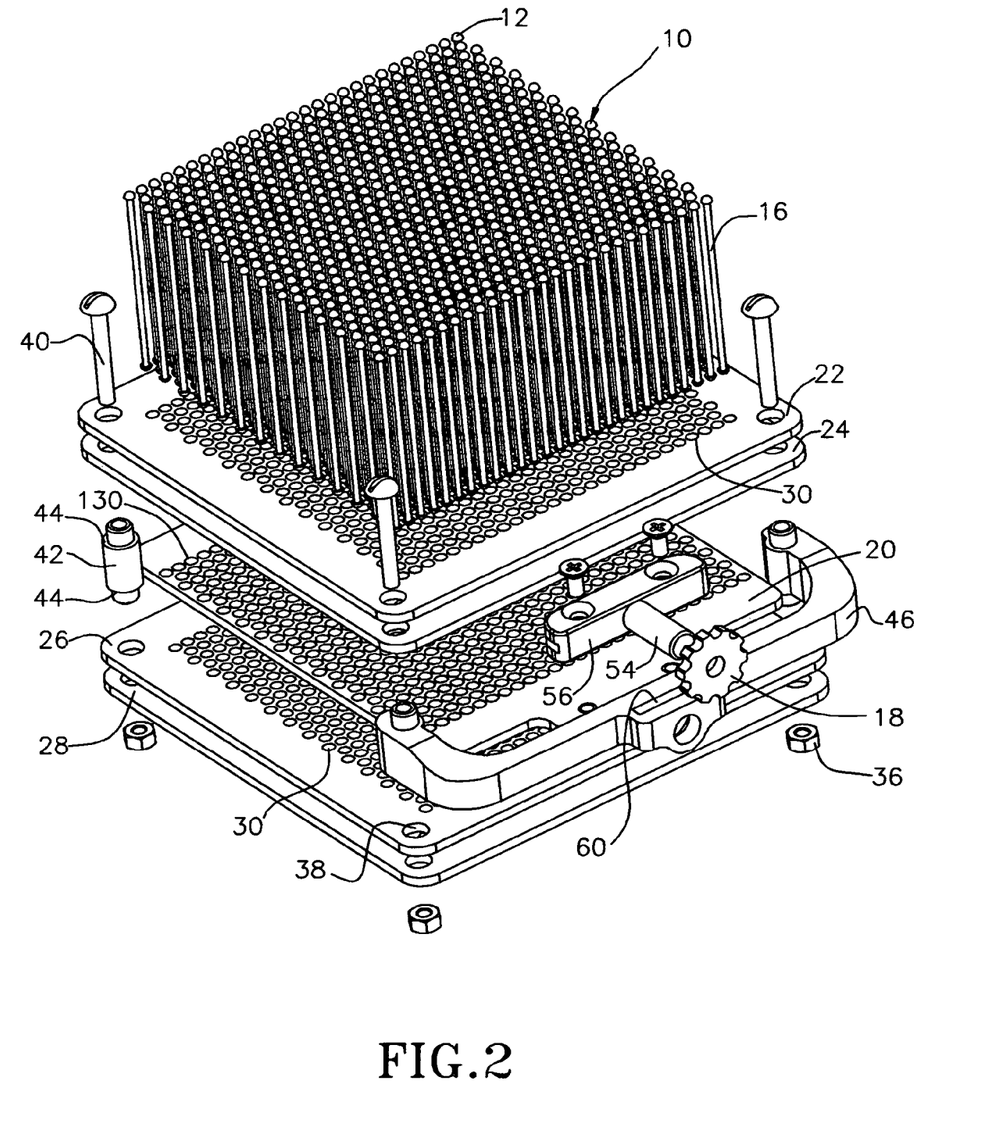
FIG. 2 is an exploded view of the image retainer of FIG. 1.
Figure 3:
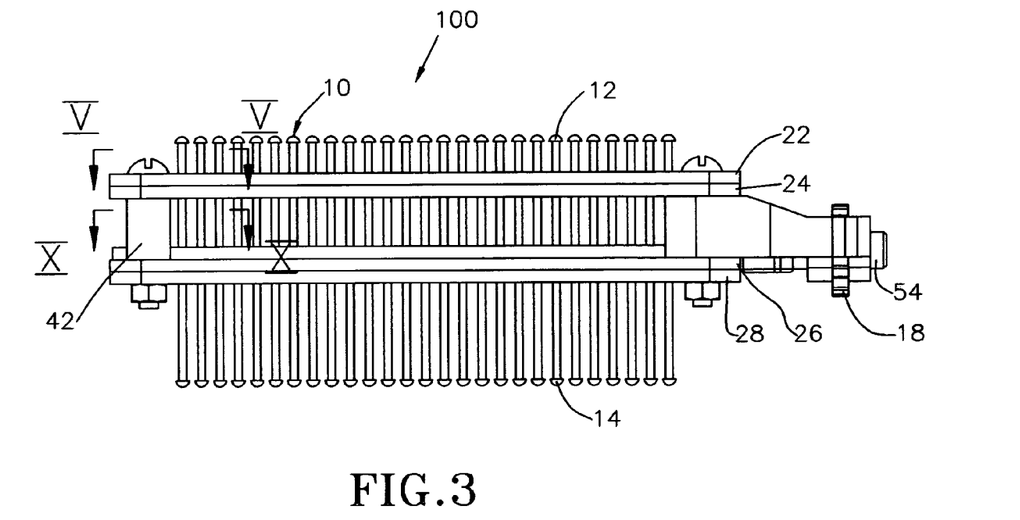
FIG. 3 is a side view of the image retainer of FIGS. 1 and 2 having a plurality of pins displaced in an unloaded position.
Figure 4:
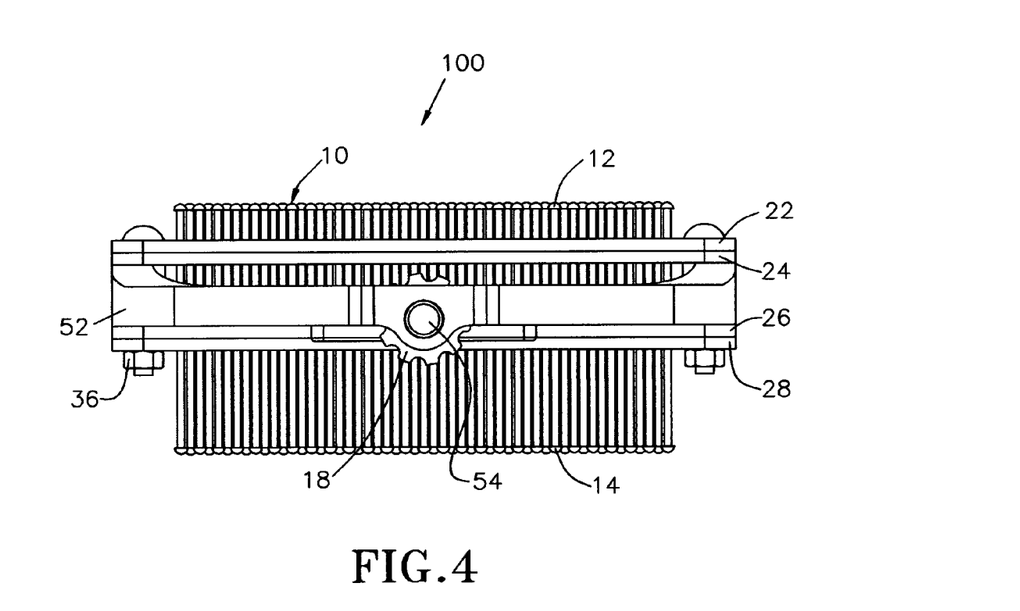
FIG. 4 is a front view of the image retainer of FIGS. 1-3.

Referring to FIGS. 1-2, an image retainer 100 is configured to recreate a 3-D image of an object loaded upon either one of opposite enlarged pinhead ends 12, 14 of pins 10 (FIGS. 1-7), which are selectively displaceable in response to a load so as to recreate the 3D image of this load.

The image retainer 100 includes a plurality of retainer plates 22, 24, 26 and 28 (FIGS. 1, 2) assembled in two pairs and each having a respective multiplicity of openings 30 (FIG. 2). Configuration of the openings is such that the pins 10, each of which has a shank or body 16 provided with fixed or removable pinheads 12, 14 (FIGS. 1-13), can freely move through each of the openings 30, which is dimensioned to have an inner diameter larger than both pin's shank or body 16 and pinheads 12 and 14. The pinheads 12 and 14 each have a smooth, preferably spherical outer surface 34 (FIGS. 6, 7) configured to prevent discomfort or inconvenience that may be experienced by the device operator whose limb is desired to be recreated and secured for a prolong period of time. Furthermore, the enlarged pinhead 34 provides for a substantially uniform distribution of driving forces, which, in turn, allows for a better steering of the pins 10 through the openings 30.

Figure 14:
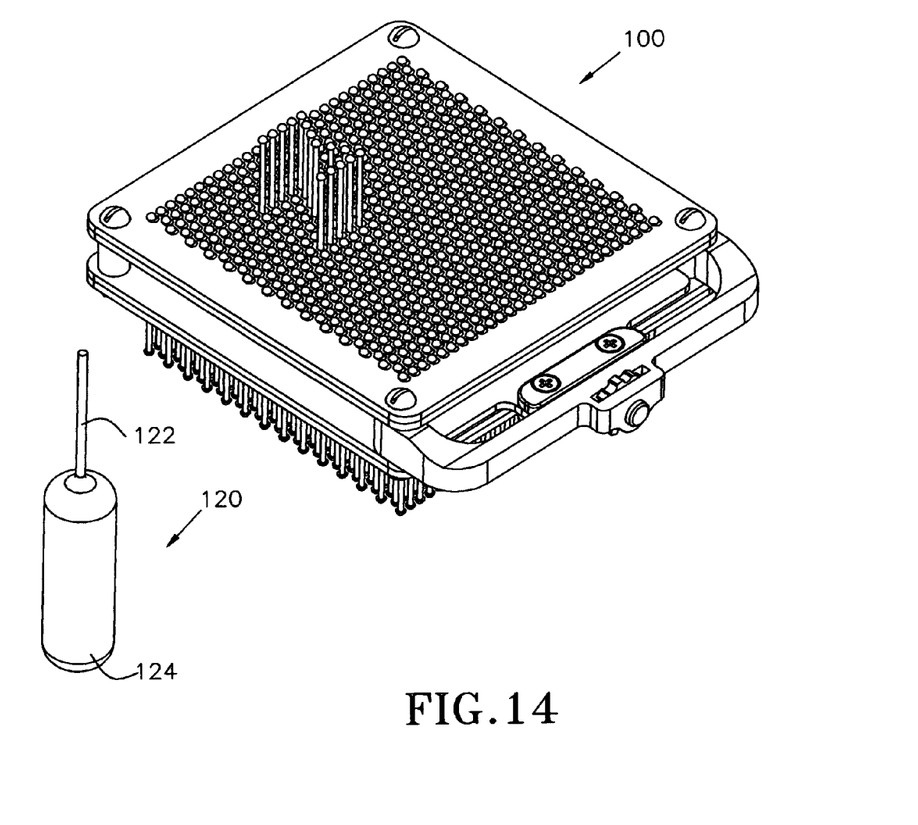
FIG. 14 is a perspective view of the imager retainer assembled in accordance with another embodiment of the invention.

If the device operator would like not to recreate the image of the load, but to create his own design, a kit including the above discussed structure may be provided with a pin actuator 120 (FIG. 14), provided with a relatively small pointing end 122 and a relatively large holder 124.

Figure 5:
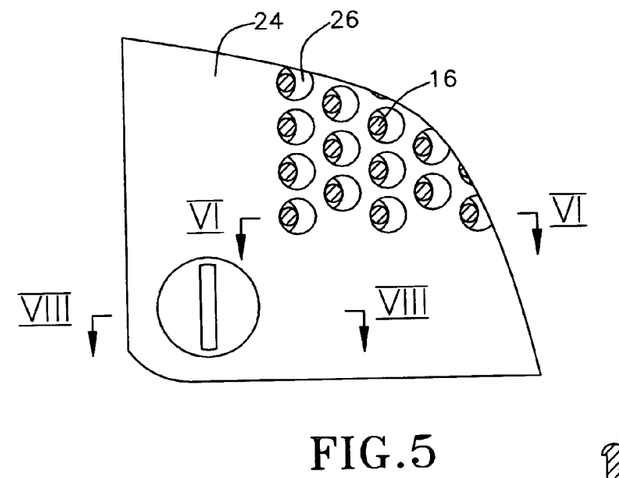
FIG. 5 is a sectional view of the image retainer along lines V-V of FIG. 3.
Figure 6:
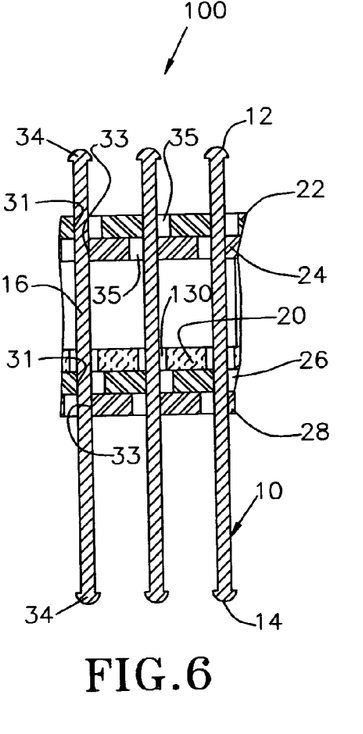
FIG. 6 is a sectional view of the assembled image retainer along lines VI-VI of FIG. 5.
Figure 7:
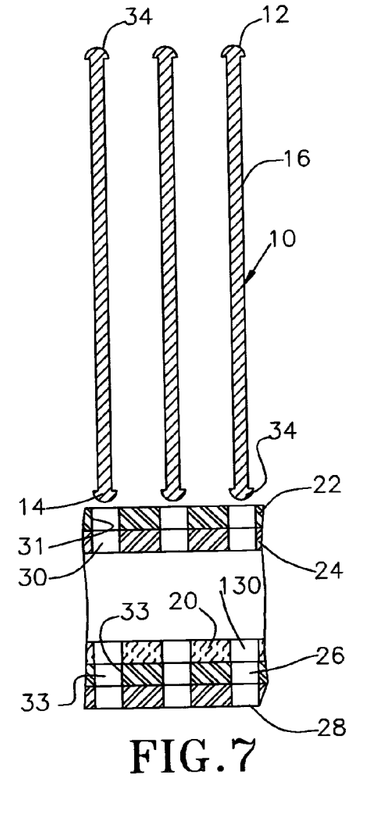
FIG. 7 is a sectional view of the disassembled image retainer along lines VI-VI of FIG. 5.
Figure 8:
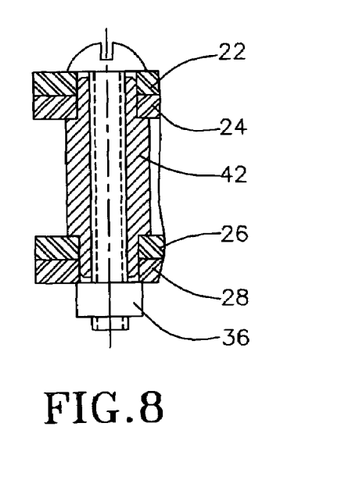
FIG. 8 is a sectional view of the assembled image retainer along lines VIII-VIII of FIG. 5.
Figure 9:
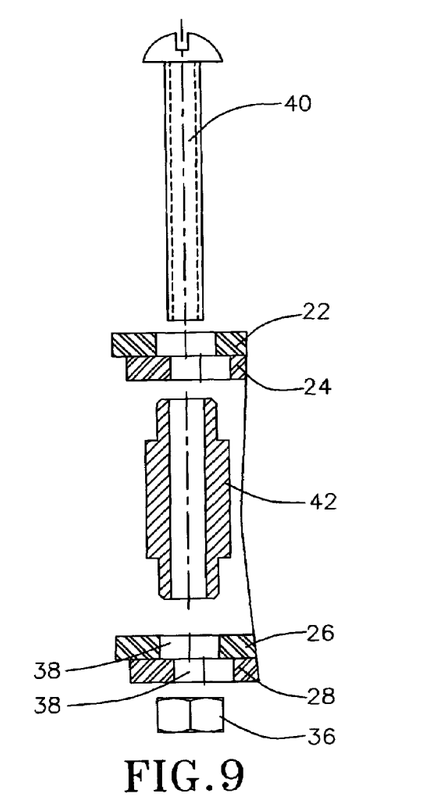
FIG. 9 is a sectional view of the disassembled image retainer along lines VIII-VIII of FIG. 5.
Figure 10:
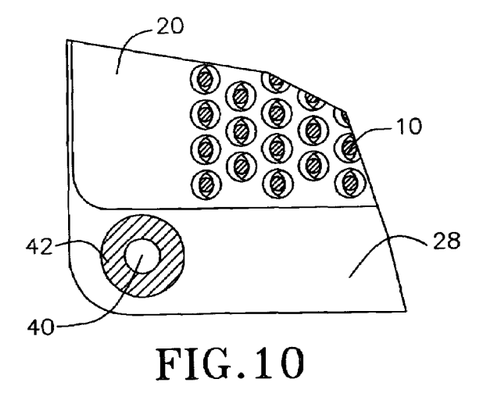
FIG. 10 is a sectional view of the image retainer along lines X-X of FIG. 3 illustrating a position of a lock plate in which unlocked pins move freely.
Figure 11:
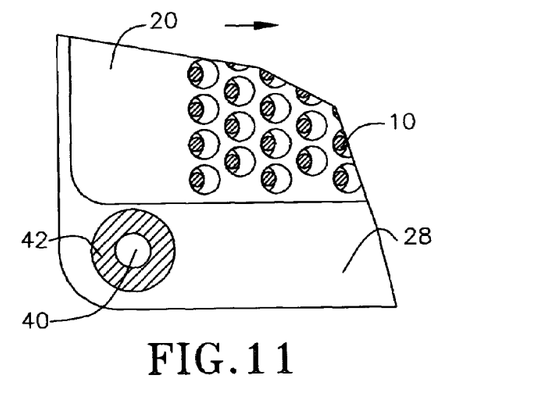
FIG. 11 is a top sectional view of the image retainer along lines X-X of FIG. 3 illustrating a position of a lock plate in which the pins are locked.

During the assembly of the image retainer 100, the retainer plates 22, 24 and 26, 28 are positioned so that the openings 30 of these plates are aligned, as shown in FIG. 7, and easily traversed by the pins 10. Typically, assembling the image retainer is provided on a flat surface supporting a plurality of nuts 36 (FIGS. 1, 2, 8 and 9), each of which is aligned with holes 38 (FIGS. 2, 8 and 9) formed in the corner regions of the retainer plates 22-28 and later traversed by fasteners 40. However, the nuts 36 are not tightened to the fasteners 40 until adjacent retainer plates 22, 24 and 26, 28 are displaced relative to one another in a plane generally parallel to the surface, as shown in FIGS. 5, 6 and 11, to have the shanks (FIGS. 6, 7) of the pins 10 squeezed between inner walls 31 and 33 (FIGS. 6 and 7) of the vertically adjacent openings 30 of all retainer plates. In other words, the openings 30 are intentionally misaligned so that while the shanks of the pins are prevented from freely running through the openings 30 of the retainer plates 22-28, each of the pins is still enabled to move in response to application of the load. However, although the pins each are displaceable in response to applying a load to either of its ends, it cannot completely disengage the plates 22, 24, 26 and 28 because pinheads 12 and 14 are larger than a portion 35 of each opening 30, which is formed as a result of displacement of the plates.

The fasteners 40 are selected from screws, bolts and pins subject only to proper dimensioning allowing for the fasteners to move through the holes 38 (FIG. 2) and for displacement of the retainer plates 22 through 28 relative to one another. The use of screws or threaded pins eliminates the need for the nuts 36, but requires threaded regions in spacers 42 (FIGS. 2, 8 and 9) positioned between the pairs of the retainer plates 22, 24 and 26, 28 and at least two extreme holes 38.

Figure 12:
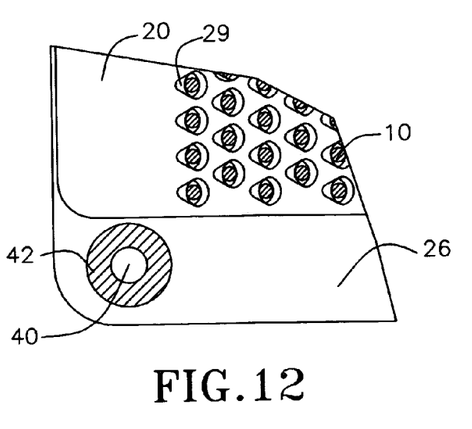
FIGS. 12 and 13 are views similar to the views of FIGS. 10 and 11, respectively, but illustrate openings having a shape different from the one shown in FIGS. 10 and 11.
Figure 13:
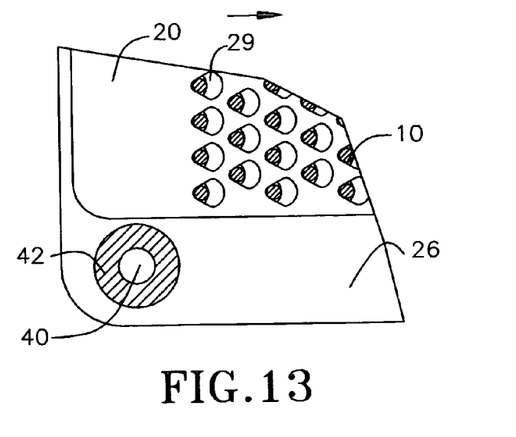

Opposite ends 44 (FIG. 8) of the spacers 42 are recessed to provide for a support of the retainer plates. In the end, once the walls 31 and 33 (FIG. 6) of the openings 30 abut the pins 10, the nuts 36 (FIG. 2) are tightened on the fasteners 40 so as to allow the pins 10 move only in response to an external force. Increasing the number of the retainer plates improves the proper positioning of the pins 10, but as few as two retainer plates, for example, the plates 22 and 28, may suffice for the purposes of this invention. While the cross-section of openings 30 of lock plate 20, as shown in FIGS. 1, 2, 5,10 and 11, is circular, FIGS. 12 and 13 illustrate lock plate 20 formed with openings 29 which have a cross-section different from the circular one and including, but not limited to, a rather conical and/or wedged cross-section.

The pins 10, displaced in response to the load application, can be locked in the impressed position by a retainer assembly, which includes an actuator 18, lock plate 20 and a holder 46. The lock plate 20 is formed with a plurality of apertures 130 (FIGS. 2, 6, 7, and 9) dimensioned to be slightly larger than the pinheads 12, 14 (FIGS. 6, 7) of the pins 10 to allow for displacement of the lock plate 20 in response to a force applied to the actuator 18 (FIG. 1). When the plates 22, 24, 26 and 28 are displaced relative one another to a position shown in FIG. 6, in which the pins 10 still can move in response to applying an external force, apertures 130 of the lock plate 20 do not prevent displacement of the pins. However, when the desired impressed position is established, the device operator applies a torque to the actuator 18 causing the plate 20 to move and engage the portion of the pins' circumference so that the pins cannot move even if an external force were applied regardless of the position of the image retainer 100.

To mount the retainer assembly (FIG. 2) to the imager retainer 100, the holder 46 (FIG. 2) has a C-shape provided with opposite legs 52 (FIG. 1), which are formed with respective openings traversed by the shanks of the fasteners 40. The C-shape of the holder defines a space between an end of the lock plate 20 and an inner surface of the holder which is sufficient to provide displacement of the lock plate to a position in which the impressed pins are locked. A variety of actuator configurations may be provided including, for example, a threaded axle 54 (FIG. 2) that is removably coupled to the lock plate 20 and further secured thereto by a pressure plate 56 and screws or axles 54 (FIG. 2). The actuator 18 (FIG. 1) is threadedly mounted on the axle 54 and pressure plate 56 and operates so that its rotation is translated into a linear displacement of the lock plate 20. A recess 60 (FIG. 1) formed in the holder 46 receives the actuator 18 and, while allowing the actuator to rotate, prevents its linear displacement with the axle 54. Conversely, the actuator 18 may be coupled to the lock plate 20 and linearly displaced therewith along a linearly immovable axle.

Figure 15:
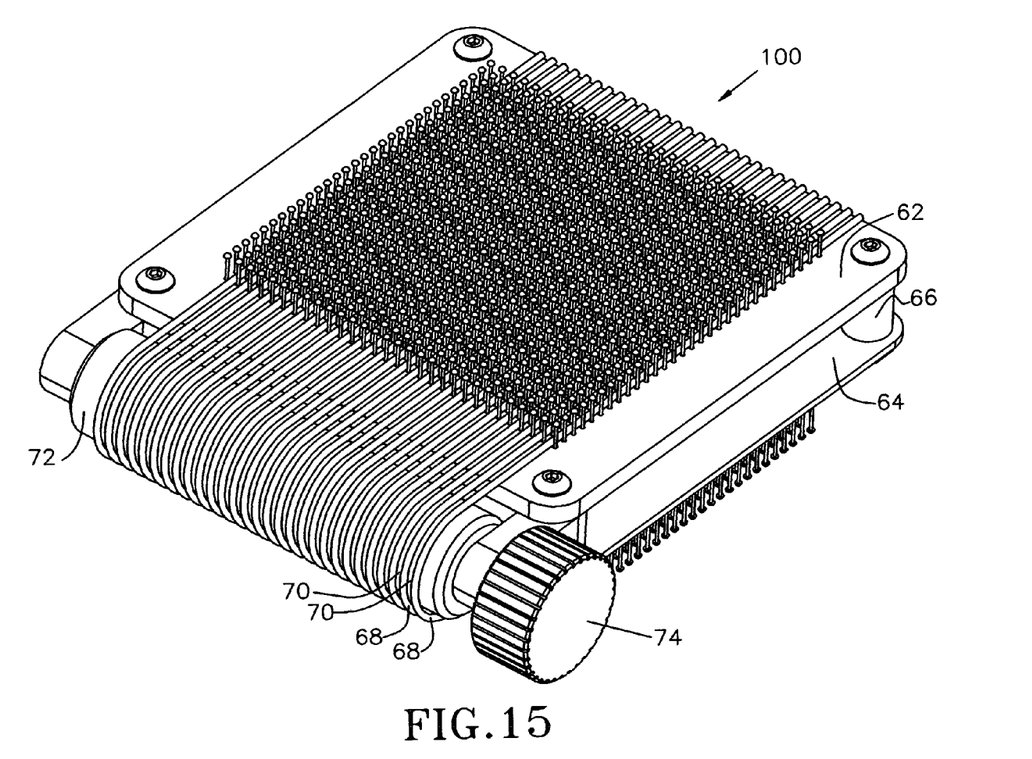
FIG. 15 is a perspective view of the inventive device configured in accordance with a further embodiment of the invention.
Figure 16:
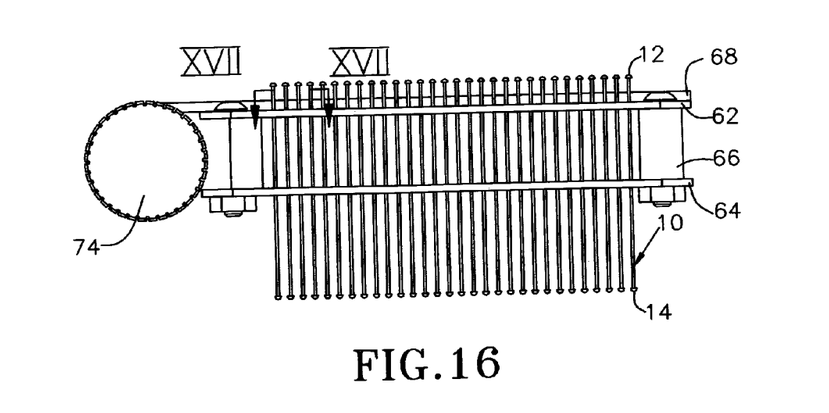
FIG. 16 is a side elevational view of the device illustrated in FIG. 15.

In accordance with a further embodiment of the invention shown in FIGS. 15, 16, 17A and 17B, the 3-D retainer assembly 100 may have a plurality of retainer plates 62 and 64 separated from one another by spacers 66 and each provided with a respective multiplicity of openings, which are traversed by pins 66 configured identically to the previously disclosed embodiments. In contrast to the previously disclosed embodiments, retainer 100 of FIG. 15 is provided with a modified locking mechanisms securing a final locking position of the pins in the impressed position thereof.

Figure 17A:
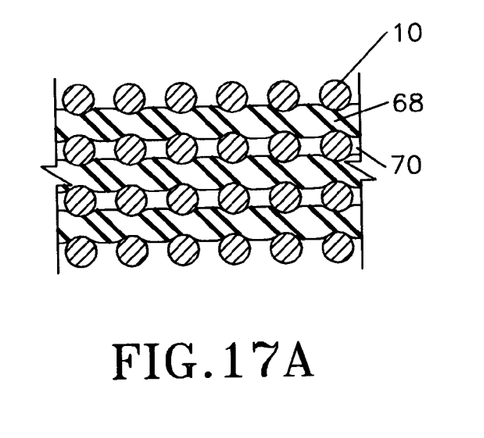
FIG. 17A is a diagrammatic view illustrating a plurality of pins of the device of FIG. 15 in a position, in which displacement of the pins is arrested.
Figure 17B:
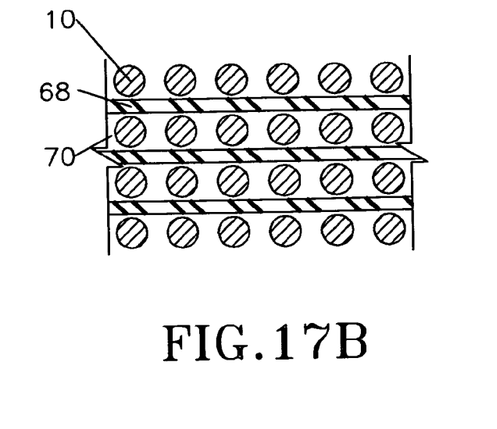
FIG. 17B is a diagrammatic view of the device of FIG. 15 having freely displaceable pins.

The locking mechanism has a plurality of separate strips 68 fixed to a drum 72 by one end thereof and having the other end fixed to the plate 62. Since the strips are made from elastic material, the device operator is able to apply a torque to a handle 74 translating into tensioning the strips. Increasing tension causes the bodies of the strips to attenuate and, thus, widen a space 70 defined between each pair of neighboring strips. Conversely, reducing the tension narrows this space. This mechanism, as shown in FIG. 17A allows the strips 68 to squeeze the rows of the pins 10, each inserted between a respective pair of strips, when a relatively small tensioning force is applied to the strips. In this position of the strips, the pins are displaceably fixed so as to retain the desired impressed image. Displacement of the pins is provided, when the device operator applies a torque to the handle 74, thereby rotating the drum 72 which, in turn, causes the strips 68 to attenuate and widen the space 70, as shown in FIG. 17B, so as to allow the pins to move.

Figure 18:
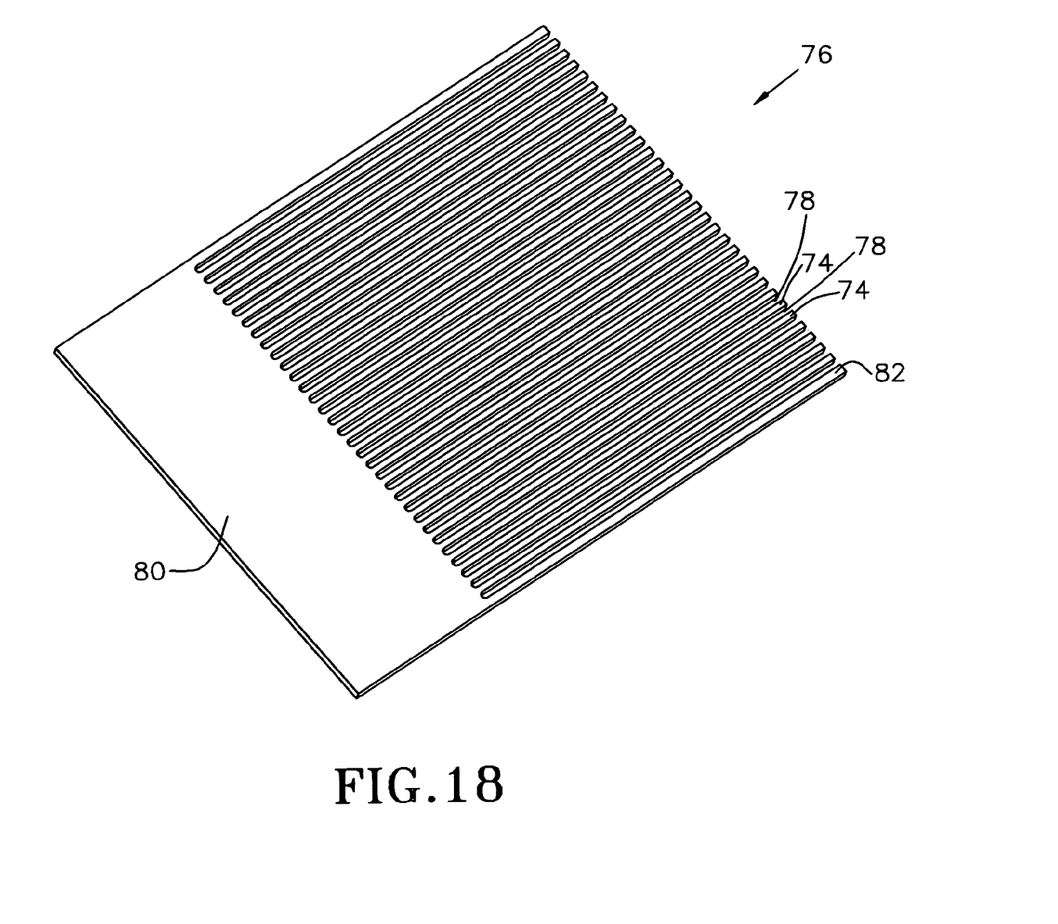
FIG. 18 is a top view f a one-piece retainer element associated with the device of FIG. 15.
Figure 19:
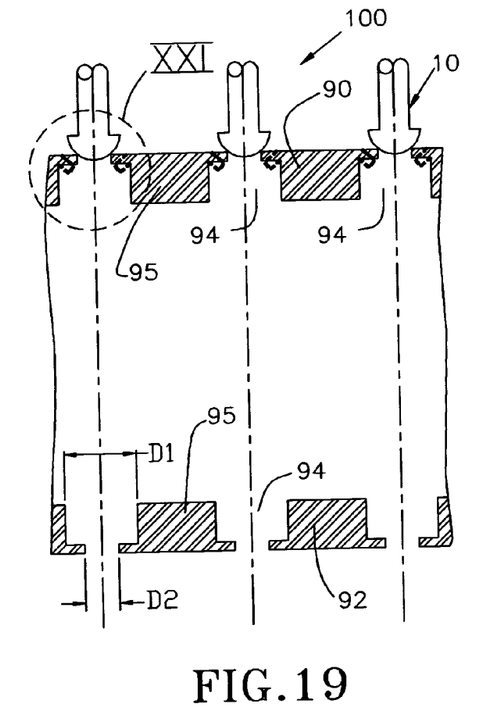
FIG. 19 is a cross-sectional view of the inventive device configured in accordance with a further embodiment of the invention and illustrating a plurality of pins that are not inserted into the device.
Figure 20:
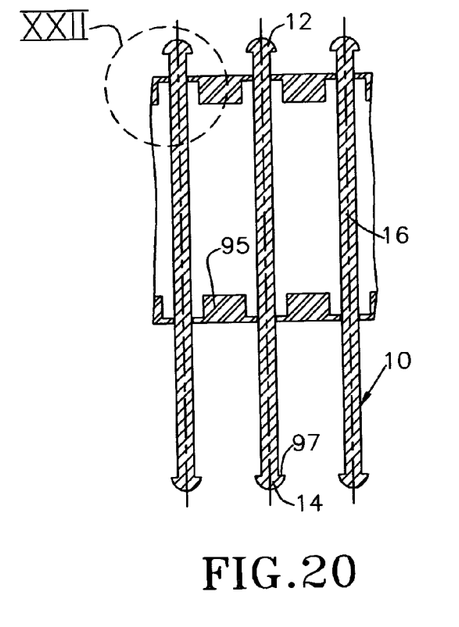
FIG. 20 is a cross sectional view of the device illustrated in FIG. 19 and illustrated in an inserted position.
Figure 21:
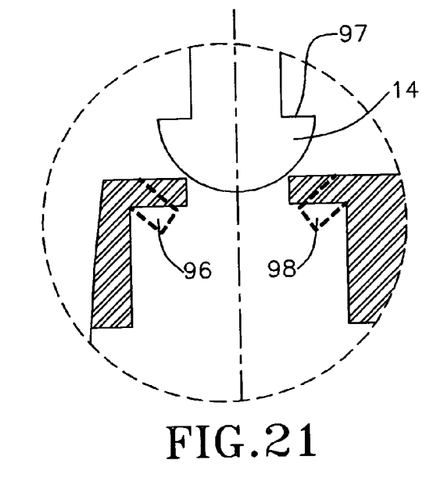
FIGS. 21 and 22 are enlarged views of a single pin before and after the pin has been inserted.

A further modification of the locking mechanism is illustrated in FIG. 18 and includes, instead of plurality of separate strips 68 of FIG. 15, a single body or mat 76 operating in a manner similar to the above-disclosed. In particular, the mat 76 has two opposite sides 80 and 82, one of which is fixed to the drum configured similarly to the drum 74 of FIG. 15, and the other side 82 is fixed to the edge region of the adjacent plate. The mat, like the separate strips, is made from elastomeric material capable of stretching in response to applying a tensioning force. At least a portion of the mat 76 is provided with alternating slots or spaces 78 and peninsulas of material 74. Accordingly, when the pins 10 (not shown) are inserted into the slots, each pair of adjacent peninsulas function as the strips capable of increasing the width of the grooves, when the tensioning force is applied, and reduce the width upon removing this force. A width modification allows the pins to be either fixed or relatively freely move through the plates whose openings, of course, are aligned with spaces or slots 70. Note that the embodiments illustrated in FIGS. 15-18 may have two or more plates 62 and 64 (FIG. 1) either displaceable, as explained in reference to FIGS. 1-14 or fixed relative to one another. If the retainer has a structure with displaceably fixed plates, either the spaced apart strips 68 (FIG. 15) or mat 76 (FIG. 18) may reliably lock the pins in the impressed position. Also, preferably opposite pinheads 12 and 14 of each pin 10 (FIG. 16) are dimensioned to be larger than the space or slot width between adjacent strips or peninsulas of material even when a maximum tensioning force is applied to the locking mechanism.

Figure 22:
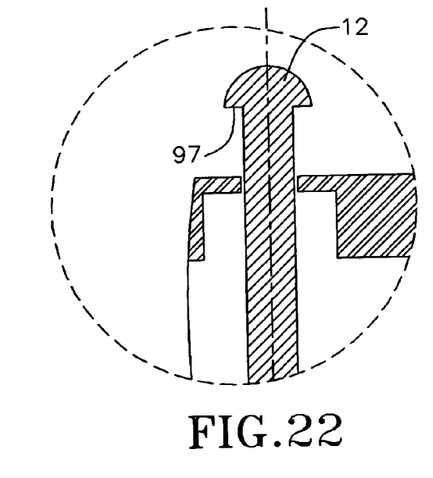

In accordance with another embodiment of the invention illustrated in FIGS. 19-22 plates 90 and 92, like the previously disclosed plates of FIGS. 1-18, have a plurality of rows of openings or spaced continuous channels 94, are made from resilient material that yields to pins 10 in response to an external pushing force. Although the pinheads 12 and 14 are larger than a distance D2 of the openings or channels, during the manufacturing of the inventive assembly, in response to an external force, spherical pinheads 14 (FIG. 20) force opposing edges 96 and 98 (FIG. 21) of lands of materials to flex inwardly. Upon penetration through channels 94, the edges spring back to the initial position, as shown in FIG. 22, which is characterized by distance D2 substantially equal to the diameter of pin body 16. Penetration through the lower plate includes the same principle as disclosed immediately above. In use, the operator of the inventive assembly cannot pull or push the installed pins through either of the plates because a flat underside 97 of the pinhead cannot produce the same wedge action upon the edges 96 and 98 as the spherical pinhead. Accordingly, the pins can slide in use, but cannot be completely removed.

Figure 23:
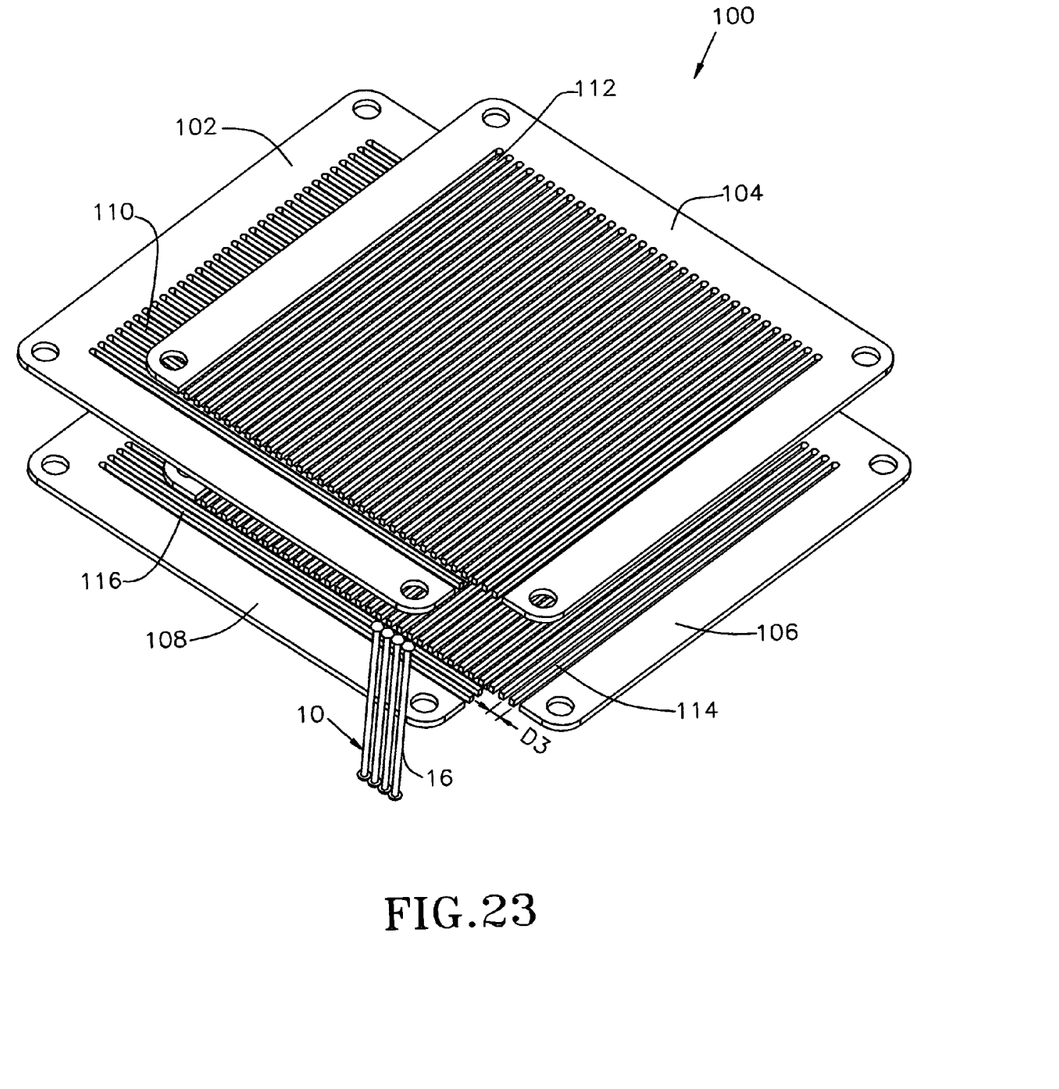
FIG. 23 is an exploded view of the inventive device configured in accordance with still a further embodiment of the invention.

FIG. 23 illustrates a method of assembling the inventive retainer assembly 100. While having a plurality of pins 10 arranged and maintained in a plurality of parallel rows, four plates 102, 104, 106 and 108, which are arranged in two spaced apart pairs are displaced so that, for example, plates 104 and 108 move in one plane and plates 102 and 108 move in a perpendicular plane. Since each plate of one pair has a plurality of teeth 114 extending perpendicular to the teeth of other plate of the same pair, displacement continues until the teeth of all four plates form a plurality of polygonal cells each traversed by a respective pin. The teeth 114 of each plate are spaced from one another at a distance $D_3$ selected to be substantially equal to the diameter of the pin's body or shank 16. In use, the teeth form a respective cell frictionally engaging the pin body and allowing it to move in response to applying an external force or load while preventing displacement of the pinhead through the cells.

Once all four plates are displaced in a position in which they are aligned, a plurality of spacers and fasteners couple the plates. Completing the assembly of the inventive retainer includes installation of a variety of locking systems disclosed above in reference to FIGS. 1-22.

It will be understood that various modifications may be made to the embodiments disclosed herein. Therefore, the above description should not be construed as limiting the scope of the invention, but merely as exemplifications of the preferred embodiments. Those skilled in the art will envision other modifications within the scope and spirit of the claims appended hereto.

The invention claimed is:

1. An image retainer comprising:
a plurality of retainer plates each having a respective multiplicity of openings and displaceable relative to one another in a first plane between a first position, in which the openings of the plurality of plates are aligned in a second plane extending transversely to the first plane, thereby forming a plurality of parallel rows of openings in the second plane, and a second position, in which the openings are misaligned;

a plurality of parallel pins each having a respective shank and a pair of spaced opposite pinheads each extending radially outwards from the respective shank, the plurality of pins each being inserted through a respective row of aligned openings in the first position of the plurality of plates and having a respective shank frictionally engaged by the plurality of plates in the second position thereof, wherein the plurality of pins are frictionally displaceable in the second plane to an impressed position of the plurality of pins in response to applying a load to one of the spaced opposite pinheads in the second position of the plurality of plates, thereby recreating a 3-D image of the load upon removing the load; and a retaining assembly operative to move in the first plane upon displacement of the plurality of pins to the impressed position and lock the pins therein, wherein the plurality of pins displaced in the impressed position are displaceably arrested to retain the 3-D dimensional image upon removing the load regardless of a spatial position of the image retainer, wherein the retainer assembly includes an actuator and a retaining element extending between the plurality of retainer plates, wherein the retaining element of the retainer assembly is a lock plate provided with a plurality of apertures, the plurality of apertures each being traversed by a respective one of the plurality pins, the lock plate being coupled to the actuator so that when the actuator is rotatable in one direction, the lock plate is displaced to a position in which a peripheral wall of each of the plurality of apertures presses against and arrests displacement of the plurality of pins. and when the actuator is rotatable in an opposite direction, the lock plate is displaced to unlock the pins.

2. The image retainer of claim 1, wherein the actuator includes a threaded axle extending parallel to a direction of displacement of the lock plate, and a nut rotatably mounted on the threaded axle.

3. The image retainer of claim 2, wherein the threaded axle or nut is coupled to the lock plate and synchronously displaceable therewith.

4. The image retainer of claim 1, further comprising a plate holder coupled to the plurality of the retainer plates and configured to support the actuator of the retainer assembly.

5. An image retainer comprising:
a plurality of retainer plates each having a respective multiplicity of openings and displaceable relative to one another in a first plane between a first position, in which the openings of the plurality of plates are aligned in a second plane extending transversely to the first plane, thereby forming a plurality of parallel rows of openings in the second plane, and a second position, in which the openings are misaligned; and a plurality of parallel pins each having a respective shank and a pair of spaced opposite pinheads each extending radially outwards from the respective shank the plurality of pins each being inserted through a respective row of aligned openings in the first position of the plurality of plates and having a respective shank frictionally engaged by the plurality of plates in the second position thereof, wherein the plurality of pins are frictionally displaceable in the second plane to an impressed position of the plurality of pins in response to applying a load to one of the spaced opposite pinheads in the second position of the plurality of plates, thereby recreating a 3-D image of the load upon removing the load, wherein each of the pinheads of the plurality of pins has a smooth outer surface and is configured to freely move through the multiplicity of openings in the first position of the plurality of retainer plates.

6. An image retainer comprising a plurality of retainer plates each having a respective multiplicity of openings and displaceable relative to one another in a first plane between a first position, in which the openings of the plurality of plates are aligned in a second plane extending transversely to the first plane, thereby forming a plurality of parallel rows of openings in the second plane, and a second position, in which the openings are misaligned; and a plurality of parallel pins each having a respective shank and a pair of spaced opposite pinheads each extending radially outwards from the respective shank, the plurality of pins each being inserted through a respective row of aligned openings in the first position of the plurality of plates and having a respective shank frictionally engaged by the plurality of plates in the second position thereof, wherein the plurality of pins are frictionally displaceable in the second plane to an impressed position of the plurality of pins in response to applying a load to one of the spaced opposite pinheads in the second position of the plurality of plates, thereby recreating a 3-D image of the load upon removing the load, wherein the plurality of retainer plates each have an arrangement of holes traversed by a respective fastener and dimensioned to be larger than a body of the respective fastener to allow for displacement of the plurality of retainer plates relative to one another between the first and second positions, the fasteners being operative to lock the plurality of retainer plates in the second position thereof.

* * * * *